Figure 1:
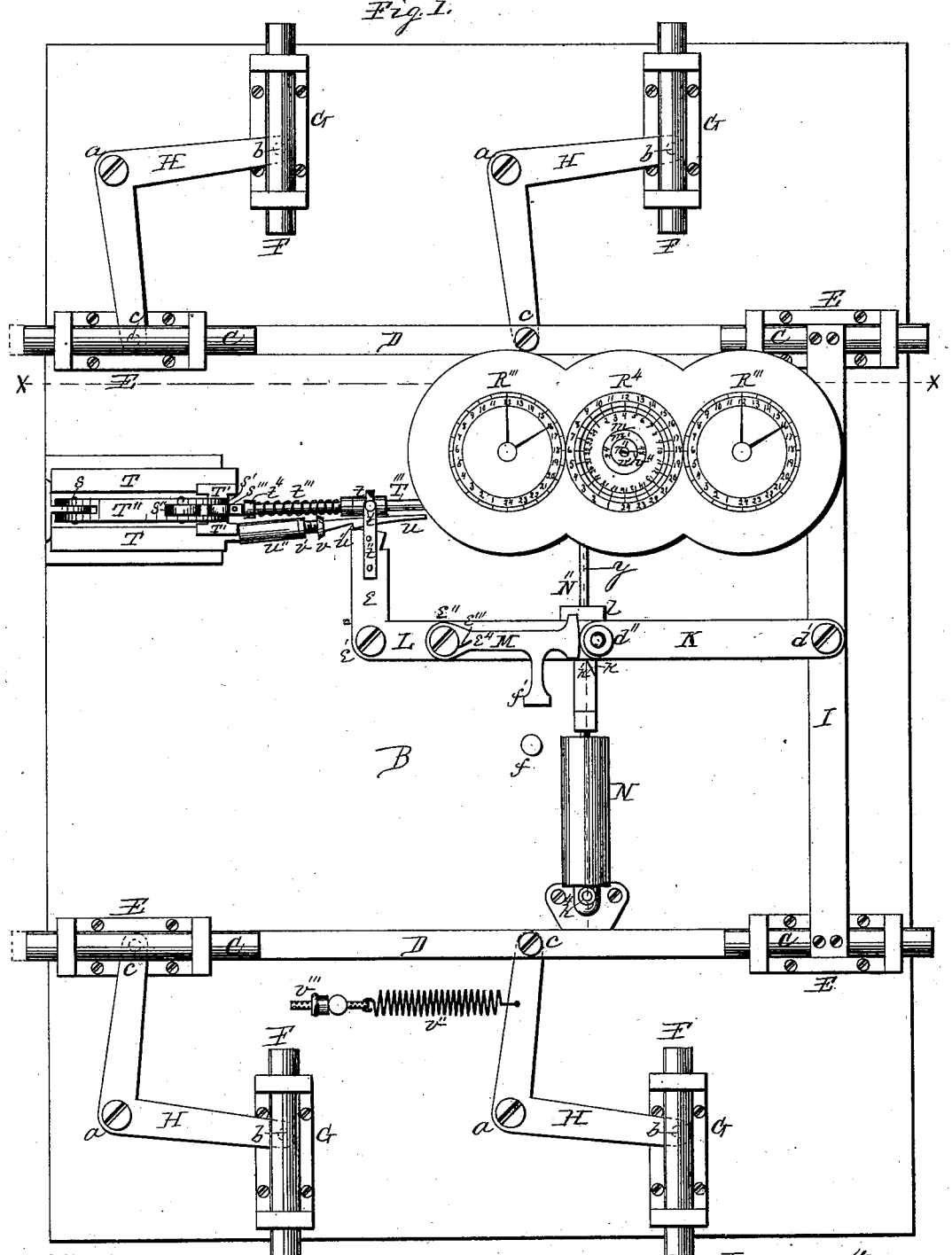

(No Model.)  6 Sheets—Sheet 1.
C. H. SHAFFER.
TIME LOCK.

No. 359,549. Patented Mar. 15, 1887.

Witnesses.
A. O. Behel
Saml N Jones

Inventor
Charles H. Shaffer
Per. Jacob Behel
Atty (No Model.) 6 Sheets—Sheet 2.

C. H. SHAFFER.
TIME LOCK.

No. 359,549. Patented Mar. 15, 1887.

Witnesses.
A. O. Behel
Saml. N. Jones

Inventor.
Charles H. Shaffer
Per Jacob Behel
Atty (No Model.) 6 Sheets—Sheet 3.

C. H. SHAFFER.
TIME LOCK.

No. 359,549. Patented Mar. 15, 1887.

Witnesses.
A. O. Behel
Daniel N. Jones

Inventor.
Charles H. Shaffer
Per Jacob Behel
Atty.

N. PETERS, Photo-Lithographer, Washington, D. C.

(No Model.) 6 Sheets—Sheet 4.
C. H. SHAFFER.
TIME LOCK.
No. 359,549. Patented Mar. 15, 1887.

Witnesses.
A. O. Behel
Dan'l N. Jones

Inventor.
Charles H. Shaffer
Per Jacob Behel
Att'y (No Model.)  6 Sheets—Sheet 5.
C. H. SHAFFER.
TIME LOCK.
No. 359,549. Patented Mar. 15, 1887.
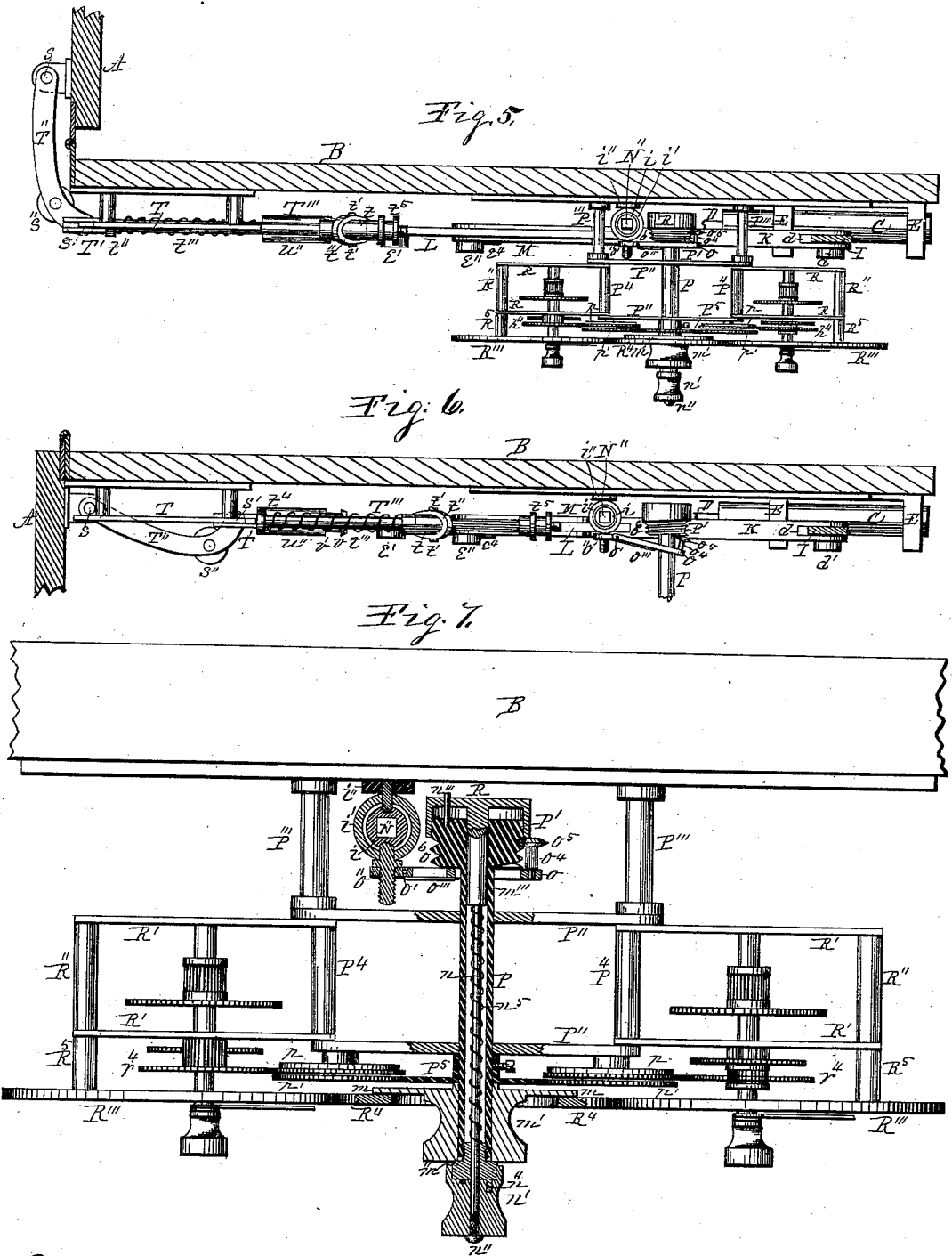

(No Model.) 6 Sheets—Sheet 6.
C. H. SHAFFER.
TIME LOCK.
No. 359,549. Patented Mar. 15, 1887.
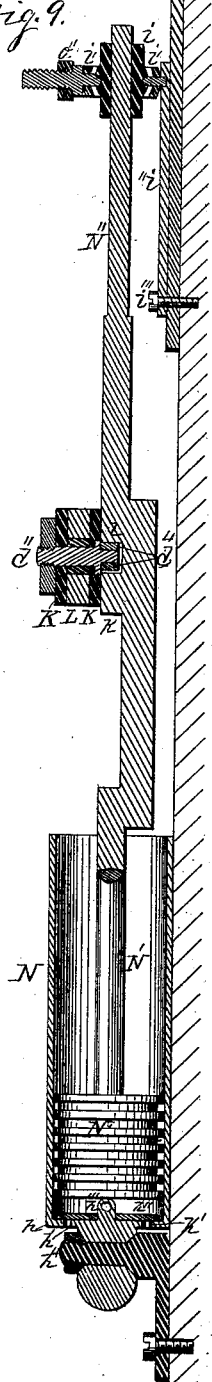
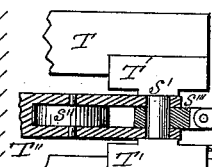
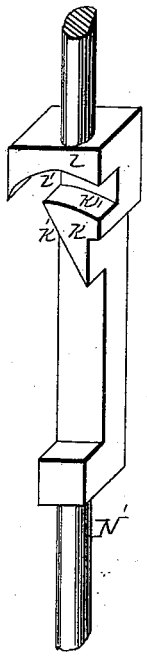
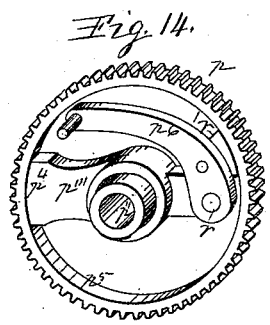
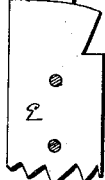
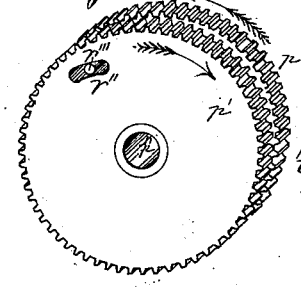
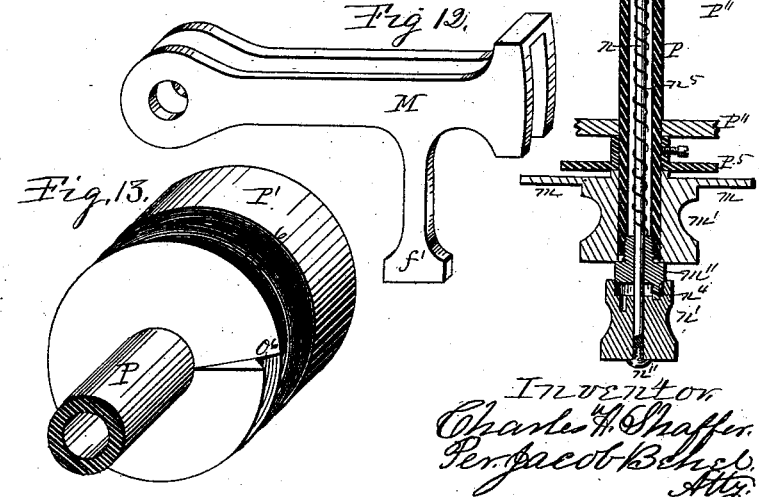
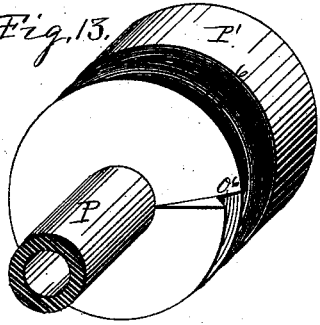
Witnesses.
A. O. Behel
Sam'l N. Jones
Inventor
Charles H. Shaffer.
Per Jacob Behel
Atty.
N. PETERS, Photo-Lithographer, Washington, D. C.

UNITED STATES PATENT OFFICE.

CHARLES H. SHAFFER, OF ROCKFORD, ILLINOIS, ASSIGNOR OF ONE-HALF TO JONES, WOODRUFF & CO., OF SAME PLACE.

TIME-LOCK.

SPECIFICATION forming part of Letters Patent No. 359,549, dated March 15, 1887.

Application filed October 3, 1884. Serial No. 144,651. (No model.)

*To all whom it may concern:*

Be it known that I, CHARLES H. SHAFFER, a citizen of the United States, residing in the city of Rockford, in the county of Winnebago and State of Illinois, have invented a new and useful Time-Lock, of which the following is a specification.

This invention relates to locks in which the time of unlocking is controlled by a time-movement or time-movements put in connection with the locking mechanism.

The object of this invention is to produce an automatic locking and unlocking mechanism operated to lock by the swinging movements of the door and its unlocking movements controlled by one or more time-movements, and capable of adjustment to unlock at any predetermined time within forty-eight hours, when forty-eight-hour movements are employed, and when adjusted to any predetermined time will unlock at every reoccurrence of the time to which it has been adjusted.

This invention consists in a lever mechanism which in the swinging movement of the door in opening operates to contract a spring employed to operate the lock-bolts both in locking and unlocking; in mechanism connecting the operating-spring with the lock-bolts in such a manner that the action of the spring exerted in the same direction shall shoot the bolts in locking and retract them in unlocking; in mechanism to release the spring in closing the door to shoot the bolts; in mechanism in connection with the bolts to hold them in their locked position; in mechanism in connection with the time movement or movements to hold the operating mechanism in position when locked; in mechanism in connection with the time movement or movements to release the operating spring or springs and the bolt-holding mechanism at the predetermined time to retract the lock-bolts; in adjustable mechanism in connection with the time movement or movements to open the lock automatically once in twenty-four hours, or once in forty-eight hours, when a forty-eight-hour movement or movements are employed. These and other improvements, all of which will be hereinafter more fully described, constitute the subject-matter of this specification.

Figure 2:
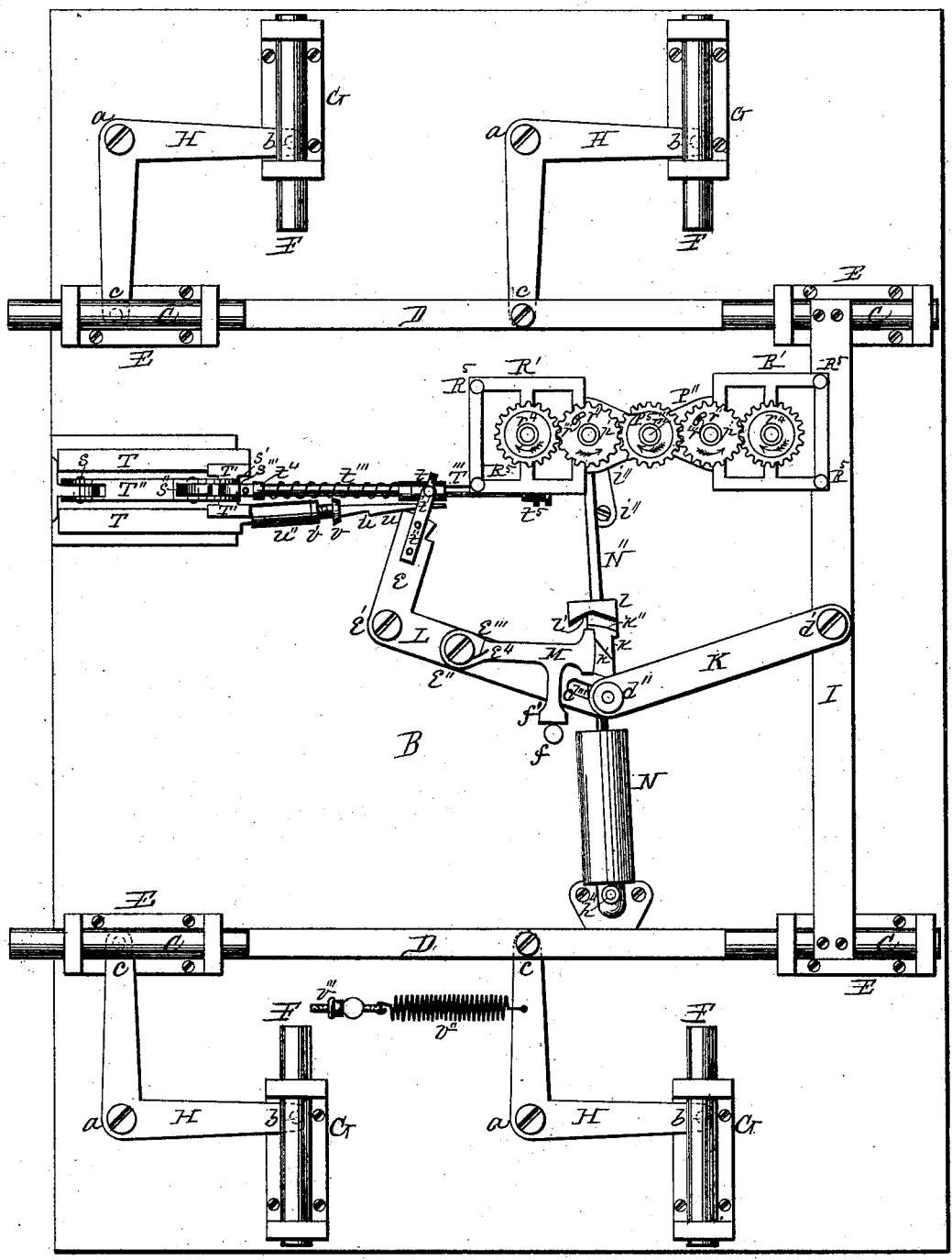
Figure 3:
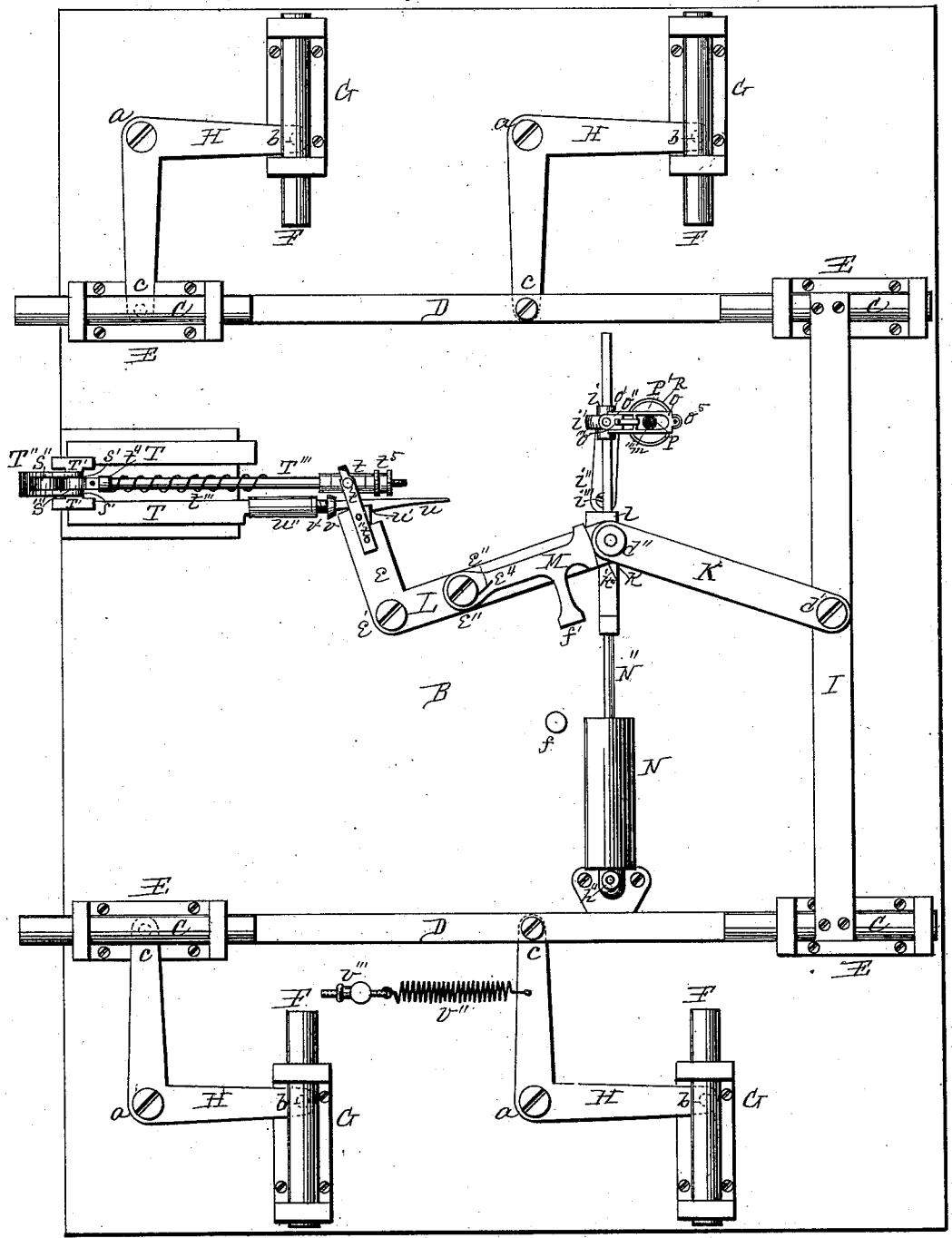
Figure 4:
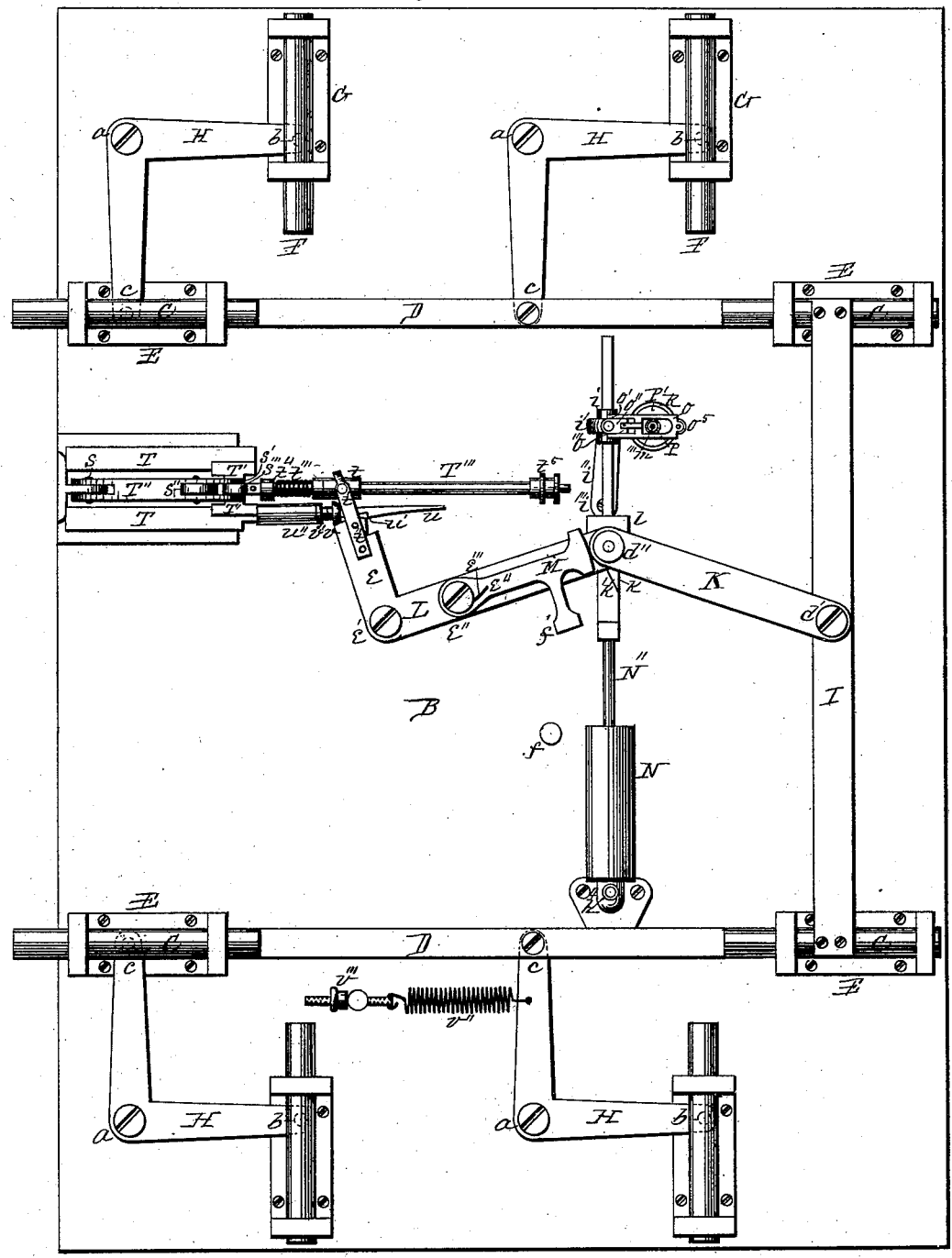

In the accompanying drawings, Figure 1 is an inside elevation of a closed door with my improvements in place thereon in their locked position. Fig. 2 is an inside elevation of a closed door with my improvements in place thereon in their unlocked position after being relieved by the action of the time-movement. Fig. 3 is an inside elevation of an open door, representing the locking mechanism in its locking position carried from its unlocked position by the opening movement of the door to a plane substantially parallel to its closed position. Fig. 4 is an inside elevation of a door nearly closed, representing the locking mechanism in its unlocked position carried nearly to its locking position in the closing movements of the door to be locked in its final closing movement. Fig. 5 is a transverse horizontal section on dotted line *x* on Fig. 1, showing the door in an open position and unlocked. Fig. 6 is a tranverse horizontal section cut on dotted line *x* on Fig. 1, showing the door closed and unlocked and time-movements omitted. Fig. 7 is a plan view of the movement-frames and their connections with the locking mechanism and with each other, which positions are shown in section. Fig. 8 is a sectional representation of the screw-threaded cam and its appliances connecting the locking mechanism with the time-movements, and showing its adjustment to open once in twenty-four hours. Fig. 9 is a vertical central section on dotted line *y*, Fig. 1. Fig. 10 is a detail of the operating mechanism enlarged and partially in section. Fig. 11 is an isometrical representation of the central portion of the piston-rod. Fig. 12 is an isometrical representation of a spring-actuated detent on the operating-levers of the bolt mechanism. Fig. 13 is an isometrical representation of the controlling-cam, showing its screw-threaded trackway employed to liberate the locking mechanism. Fig. 14 is an isometrical representation of the clutching mechanism employed to connect the time-movements, with one of the gear-wheels removed. Fig. 15 is an isometrical under face view of the clutching mechanism removed from its gear-wheel support, and Fig. 16 is an isometrical representation of the gear-wheels of the clutching mechanism employed to connect the time-movements.

In the drawings, A represents the walls or jambs of the door-opening of a safe, vault, or other structure, and may be produced in any suitable or known form and of any proper material.

At B is represented a door, which may be produced from any proper material and of any suitable construction, and of dimensions to fit the opening for which it is intended. The door is hung or hinge-jointed to the jamb of the opening to swing open and shut on its hinge-jointed connection with the jamb. The door B is provided with a system of locking-bolts, which in this instance are produced in like halves, in which suitable bolts, C, are connected by a bar, D; or they may be produced in one piece and are placed crosswise of the door, having the bolts C supported to slide endwise in suitable bearings, E, fixed to the door.

At F are represented locking-bolts supported to slide endwise in suitable bearings, G, fixed to the end portions of the door.

At H are represented bell-crank levers having a central pivot-connection at $a$ with the door. The outer ends of the horizontal arms of these bell-crank levers H are pivot-jointed at $b$ to their respective locking-bolts F, and the outer ends of their vertical arms are pivot-jointed at $c$ to their respective transverse bolts C or to their connecting-bars D. These like halves of the system of locking-bolts are connected toward the front edge portion of the door by means of a vertical connecting-bar, I, having its ends securely fixed to the front transverse bolts in such a manner as to cause the like halves of the lock-bolt system to move in unison.

At K and L are represented the two arms of a jointed toggle-lever employed to operate the lock-bolt mechanism. The end portions of the arm K of this lever are slotted vertically, as represented at $d$, Figs. 5 and 6, and one end thereof embraces the central portion of the connecting-bar I, to which it is pivot-jointed at $d'$. The inner slotted end of this arm K receives the inner end of the arm L, which is pivotally connected therewith at $d''$. This arm K at its pivotal connection with the arm L is provided with a roller, $d^t$, projecting from its rear face, for a purpose to be hereinafter shown.

The inner end of the arm L, pivotally connected with the inner end of the arm K, is slotted lengthwise laterally, as shown at $d'''$, to permit of an endwise sliding movement of the arms of the lever at their pivotal connection. The arm L of this lever at its outer end is provided with an arm, $e$, rising at a right angle to the arm L, producing a right-angled bell-crank lever, for a purpose hereinafter to appear. This bell-crank lever-arm of the toggle-lever is pivotally connected at its angular point $e'$ to the door in substantially the same horizontal or transverse plane of the pivotal connection of the arm K with the connecting-bar I, and at such point therein as to permit the outward movement of the bolts to their locking position when the arms of the toggle-lever are extended in line, as shown in Fig. 1, and, when the toggle-lever is depressed or elevated from its line position to the positions shown in Figs. 1, 3, and 4, will retract the lock-bolts and hold them in their unlocked position, as therein shown. A detent, M, slotted to embrace the arm L of the toggle-lever freely, is put in place on said arm and pivotally connected thereto at a point, $e''$, in such position thereon that when the toggle-lever arms are extended from their inclined position to their line position, as shown in Fig. 1, it will, in connection with the toggle-levers, shoot and, by its engagement with the inner end of the lever-arm K, hold the lock-bolts in their locking position, as therein shown.

At $e'''$ is represented a spring having a fixed connection of its coiled end with the pivot-support of the detent and its free end connected at $e^4$ with the detent in such a manner that its spring action will tend to hold the detent in contact with the arm.

At $f$ is represented a stop-stud extending outward from the door in position to receive the arm $f'$, depending from the lower edge of the detent, and in the descent of the toggle-lever will operate to lift the free end of the detent and disengage it from the end of the arm K of the lever, as shown in Fig. 2.

From the foregoing it will be seen that when the lever is in the position shown in Fig. 2 the lock-bolts will be retracted, and, by reason of the pendent arm $f'$ of the detent engaging the stud $f$, the detent will be lifted from its connection with the inner end of the arm K, as shown at Fig. 2, and will permit the lever, by means of its central slotted arm-connection, to be raised to the position shown in Figs. 3 and 4 without moving the lock-bolt mechanism. In this movement of the lever from its lowest to its highest position the detent will be carried on the inner end of the arm K until the lever has reached or nearly reached its highest point, or until the end of the arm K is carried from under the detent, when it will drop or be carried by the action of the spring $e^4$ to engage the end of the arm K, as shown in Figs. 3 and 4, after which the downward movement of the lever to a horizontal or line position, as shown in Fig. 1, will operate to shoot the bolts to their locking position, as therein shown, and the horizontal position of the lever will hold them in their locked position to prevent the retraction of the bolts. The further downward movement of the toggle-lever to the position shown in Fig. 2 will operate to retract or withdraw the bolts to their unlocked position and lift the detent from its operating-connection with the lever.

At N is represented a cylinder of suitable dimensions, open at its upper end and having its lower end or head, $h$, provided with induction-ports $h'$, to admit air. This cylinder is provided with a disk-valve, $h''$, to rest on the inner face of the end or head $h$ of the cylinder, and is held centrally thereon in a free manner by means of an axial stud, $h'''$, rising from the inner face of the head and extending upward through an axial opening in the disk-valve, and a pin passed through the stud above the disk serves to limit its upward movement. This disk-valve is employed to close the ports against the escape of air from the cylinder at this point and admit air to the cylinder through the ports. The cylinder is pivotally connected at its lower end at $h^4$ to the door in a vertical line with the joint-connection of the toggle-lever.

At $N'$ is represented a piston fitted to the cylinder in the manner known as a "loose fit," and its periphery is provided with a series of annular grooves in the usual manner of producing like pistons.

At $N''$ is represented a piston-rod rising from the piston through the open end of the cylinder, and its upper end is supported in a guide, $i$, to move endwise freely therein. The guide $i$ is pivotally supported to oscillate within a ring-support, $i'$, which is fixed to the free end of a lever, $i''$, the lower end of which is pivotally connected at $i'''$ with the door in such a manner as to permit a lateral movement of the piston-rod. The central portion of the piston-rod is enlarged and is recessed on its front face in such a manner as not to interfere with the movement of the toggle-lever. The upper end of the enlarged portion of the piston-rod is produced in cam form in two parts—a lower part, $k$, having an under inclined working-face, $k'$, and an upper curved inclined working-face, $k''$, and an upper part, $l$, with under curved working-face, $l'$. The position of the cam and of its working-faces is such that in the upward movement of the toggle-lever the roller $d^4$ on the rear face of the arm K will engage the under inclined face, $k'$, of the lower portion, $k$, of the cam and impart a lateral swinging movement to the piston-rod, and the onward upward movement of the lever will carry the roller in contact with the curved under face, $l'$, of the upper portion, $l$, of the cam and cause a partial return lateral movement of the piston-rod and carry the curved inclined upper surface, $k''$, of the lower cam, $k$, under the roller $d^4$ on arm K.

At P is represented a tubular shaft fitted at one end with a controlling-cam, $P'$, cylindrical in section and screw-threaded. This shaft, with the controlling-cam fixed thereto, is supported to revolve in bearing-plates $P''$, supported on pillars $P'''$ projecting from the door and the intermediate pillars, $P^4$, a portion of the time-movement frame, to be hereinafter described.

At $P^5$ is represented a gear-wheel fitted to receive the tubular shaft P, on which it is mounted and fixed in position thereon by means of a set-screw.

At $m$ is represented a rotary dial provided with a hub, $m'$, bored to receive the tubular shaft P, on which it is made adjustable relatively with the controlling-cam, for a purpose to appear hereinafter. This rotary dial is held in position by means of a removable bearing, $m''$, having a screw-threaded connection with the end of the tubular shaft P, to clamp the dial against the gear-wheel $P^5$, fixed on the shaft. This removable bearing $m''$ is centrally bored to receive a shaft.

At R is represented a cylindrical cap adapted to receive the controlling-cam and to slide thereon freely, and its controlling-edge is preferably produced in spiral form, to conform to the spiral screw-threaded trackways of the controlling-cam. This cap R is provided with an axial shaft, $m'''$, to enter the tubular shaft freely, and its outer portion, $n$, is reduced and extends through the removable bearing $m''$ and through a thumb-cap, $n'$, which is held in place on the shaft in a free manner by means of a screw, $n''$, having screw-thread connection with the shaft. The reduced portion $n$ of the shaft $m'''$ within the tubular shaft P is surrounded with a spiral spring, $n^5$, operating against the shoulder formed in reducing the shaft and against the removable bearing $m''$, and serves to hold the cylindrical cap R in its adjusted position on the controlling-cam and the thumb-cap $n'$ in its adjusted position on the removable bearing $m''$, but in such a manner that the cylindrical cap R and the thumb-cap $n'$ may be changed to the positions relatively with the other parts, to expose more or less of the screw-threaded end portion of the controlling-cam, as shown in Figs. 7 and 8.

At $n'''$ is represented a guide-pin fixed in the controlling-cam and extending outward through the cylindrical cap R in a free manner, to permit an endwise adjustment of the cap and to cause it to rotate with the controlling-cam.

At $n^4$ is represented a stud-pin rising from the outer face of the removable bearing $m''$ and entering a hole in the thumb-cap $n'$, as shown in Fig. 7, to hold the parts in their adjusted position to unlock once in forty-eight hours, and when adjusted to unlock once in twenty-four hours, as shown in Fig. 8, the stud-pin $n^4$ will enter a hole in the thumb-cap of less depth and hold the parts in their adjusted position, as therein shown.

At $o$ is represented a lever slotted lengthwise to receive the tubular shaft of the controlling-cam, and its end portion is pivoted at $o'$ to a support, $o''$, fixed to the guide-support of the piston-rod in such a manner as to permit of an outward swinging movement, as shown in Fig. 6.

At $o'''$ is represented a spring having a fixed connection with the support $o''$, its free end resting against the slotted lever in such a manner that its spring action will tend to hold the lever in contact with the controlling-cam. The free end of this slotted lever is provided with a stud, $o^4$, projecting from its side to overlap the screw-threaded face of the controlling-cam- On the free end of the stud $o^4$ is journaled a traveling wheel, $o^5$, having a V-formed periphery to enter the screw-threaded trackway $o^6$ formed in the periphery of the controlling-cam. In this construction, in the movement of the piston-rod toward the controlling-cam to the position shown in Figs. 5 and 7, the traveling wheel will be carried to overlap the screw-threaded face of the controlling-cam, and, limited in its overlapping movement by the spiral edge of the cylindrical cap to the controlling-cam, will engage the screw-threaded trackway, and in the rotary movement of the controlling-cam will be carried over its end and permit the piston-rod to move from the controlling-cam to the position shown in Fig. 6.

At R' are represented side walls, and at R'' and P⁴ pillars, all of which are suitably joined to each other and constitute the movement-frames.

At R''', R''', and R⁴ are represented dials supported in position on the movement-frames on pillars R⁵ projecting therefrom. One of these dials, R⁴, is produced with an open center or in annular form. Within these movement-frames and between them and the dials are supported the gear-trains with the necessary mechanism to produce suitable time-movements, with the usual hour and minute hands. These time-movements may be of any of the known varieties suitable for the purpose, and are independently connected with the controlling-cam by means of intermediate clutch mechanism. The clutch mechanism consists, essentially, of a chambered gear-wheel, $p$, a disk-wheel, $p'$, a radial clutch-arm, $p'''$, a curved lever, $p^6$, and clutch block $r'$.

The clutch gear-wheel $p$ is chambered on its inner face side, and is provided with a tubular hub, $p''$, projecting therefrom. A radial clutch-arm, $p'''$, is loosely journaled on the tubular hub, and is provided with a foot, $p^4$, to engage the internal surface of the annular rim $p^5$, forming the recess of the wheel.

At $p^6$ is represented a curved lever having a pivotal connection at one end, at $r$, to one end of the clutch-arm. A clutch-block, $r'$, is pivotally connected to the curved lever near its pivotal connection with the clutch-arm, to engage the inner face of the annular rim $p^5$ and force the foot of the clutch-bar against the rim when the free end of the curved lever is moved outward or from the center of the recessed gear-wheel. The disk gear-wheel $p'$ is fitted to revolve on the tubular hub of the recessed gear-wheel, and is fitted with an oblique slot, $r''$, to receive a stud-pin, $r'''$, projecting from the free end of the curved lever.

By this construction of the parts it will be seen that a slight movement of either or both of the gear-wheels in the direction indicated by the arrows in Fig. 16 will operate to expand the clutch to connect the gear-wheels and cause them to move in unison, and a movement of one or both of the gear-wheels in a direction opposite that indicated by the arrows will release the clutching mechanism and permit an independent movement of the gear-wheels in opposite directions. The position of the gear-wheels of this clutching mechanism relatively with the time-movements and with the controlling-cam are such that the teeth of the chambered wheels $p$ engage the teeth of the hour-wheel $r^4$ of their respective time-movements and the teeth of the disk-wheels $p'$ engage the teeth of the gear-wheel $P^5$ on the tubular shaft of the controlling-cam. This connection of the time-movements with the controlling-cam by means of the gear-toothed clutching mechanism is such that the time-movements, either jointly or independently, operate to impart motion to the controlling-cam, and if from any cause one of the time-movements stop, the controlling-cam will be carried by the other time-movement, which may still be running. In this instance I have employed two time-movements, for greater security against accidental disarrangement, and for still greater security additional movements may be employed; but a well-constructed single time-movement in many applications of my improved lock will be found sufficient.

At T T are represented guide-trackways supported on the door near its hinged edge portion in a suitable position relatively with the toggle-lever.

At T' is represented a cross-head fitted to move freely on the guideways T T.

At T'' is represented a curved lever having a pivotal connection at $s$ to the jamb to which the door is hung, and also a pivotal connection at $s'$ with the cross-head. This curved lever T'' is provided at $s''$ with a roller to engage the inner corner of the door when opened. The construction and application of these several parts are such that in opening and closing the door the cross-head will be made to traverse the guideway in both directions.

At T''' is represented a connecting-rod of piston form having a pivotal connection with an eye, $s'''$, journaled to the cross-head within the slotted outer end of the curved lever T''. The connecting-rod T''' is fitted to slide endwise freely in a tubular support, $t$, having a trunnion-connection at $t'$ with a stirrup, $t''$, fixed to the right-angled arm $e$ of the toggle-lever.

At $t'''$ is represented a spiral spring surrounding the connecting-rod T''' between a collar, $t^4$, fixed to its pivoted end, and the end of the tubular support $t$, or a washer engaging the end of the tubular support. The free end of the connecting-rod T''' is fitted with a screw-nut, $t^5$, made adjustable thereon to vary the opening movement of the door for the purpose of setting the mechanism to lock the door when closed.

At $u$ is represented a detent having a pivotal connection with the end of one of the guideways T, from which point it projects over the free end of the right-angled arm $e$ of the toggle-lever and between the arms of the stirrup $t''$, fixed to the outer end thereof. This detent is formed with a hook-catch at $u'$, to engage the inclined notched edge of the arm e of the toggle-lever, as shown in Figs. 3 and 4, to hold the arms of the toggle-lever in their elevated position, as therein shown.

At $u''$ is represented a cylinder placed on the detent $u$, with its division-wall $u'''$ placed against the end of the guideway to which the detent is pivoted. A spiral spring, $u^4$, surrounds the detent within the cylinder between the division-wall $u'''$ and a pin, $u^5$, passed through the detent within the cylinder.

At $v$ is represented a tubular screw-nut bored to receive the detent freely and is screw-threaded to enter the screw-threaded end of the cylinder $u''$, in which it is made adjustable, and when adjusted is fixed in position by means of a jam-nut, $v'$. The outer end of the screw-nut $v$ is a tappet of conic form, as clearly shown in the drawings, to disengage the hook from the toggle-lever. In closing the door the cross-head will engage the end of the cylinder $u''$ and force it forward, causing the conic end of the screw-nut $v$ or tappet to rise on the curved outer end of the angle-arm $e$ of the toggle-lever arm L and disengage the hook-catch $u'$ from its hold thereon and permit the toggle-lever to drop to its horizontal position and shoot the lock-bolts, as shown in Fig. 1.

At $v''$ is represented a supplemental spiral spring connected at one end to one of the bell-crank levers employed to operate the lock-bolts, and its other end is connected to an adjusting-screw, $v'''$, fitted with a thumb-nut, by means of which its spring force may be adjusted. In closing the door for the purpose of locking, the spring $t'''$, employed to shoot the bolts, will be compressed, as shown in Fig. 4, and, when released to expand to the position shown in Fig. 1, in shooting the bolts in locking it will exert a force more than sufficient to shoot the bolts, and in this operation a portion of the surplus power exerted by the spring $t'''$ will be transferred to or stored up in the supplementary spring $v''$, to be utilized in connection with the remaining force of the spring $t'''$ to retract the lock-bolts in unlocking.

The several dials are preferably graduated in twenty-four hour divisions, and are numbered consecutively from one to twenty-four, commencing at their lower central portion and ascending on their left-hand side and descending on their right-hand side to the place of beginning. In this system of numbering the dials the number 24 thereon is designed to represent the midnight hour in the division of time.

The rotary dial $m$ is adjusted in such position relatively with the controlling-cam that when the traveling wheel $o^5$ leaves the controlling-cam the numbers on the rotary dial will coincide with the corresponding numbers on the fixed central or annular dial, $R^4$.

In the use of my improved locking mechanism the time-movements are first wound and then adjusted to meridian, local, or apparent time, or to any time the user may prefer; then the rotary dial $m$ is turned until one of the figures upon it representing the predetermined time is opposite the figure on the fixed dial $R^4$ which corresponds to the time indicated by the hands on the dial of the time-movement, as shown in Fig. 1, which adjustment indicates that the bolt mechanism will be unlocked at eight o'clock a. m., after the time of closing the door. The outer face of the hub $m'$ of the rotary dial is provided at opposite radial points with the numbers 24 and 48, which represent, respectively, twenty-four hours and forty-eight hours. The thumb-cap $n'$ on the shaft R of the controlling-cam is provided with an index finger or notch, $v^4$, extending down the side thereof, which, when adjusted, as shown in Fig. 1, to the number 48, will place the parts in the position shown in Fig. 7, and indicates that the bolts will be unlocked once in forty-eight hours, and when the index finger or notch $v^4$ is adjusted to the number 24, as shown in Fig. 1, the parts will be placed in the position shown in Fig. 8, and indicates that the bolts will be unlocked once in twenty-four hours.

From the foregoing it will be seen that with the door closed and the parts in their unlocked position, as shown in Figs. 2 and 6, the door may be opened to the position shown at Fig. 5, in which opening movement, by reason of the connecting piston-rod in its connection with the right-angled arm of the toggle-lever, the parts of the locking mechanism will be carried from their unlocked position shown in Figs. 2 and 6 to their unlocked position shown in Figs. 3 and 5. In this movement of the parts, by reason of the roller $d^4$ engaging the cams $k$ and $l$, the piston-rod $N''$ will be carried upward, and from its inclined position, as shown in Fig. 2, to a vertical position, and the traveling wheel $o^5$ will engage the trackways of the controlling-cam to hold the piston-rod in its vertical position, and the hook-catch $u'$ on detent $u$ will engage the angle-arm $e$ of the toggle-lever and hold it in its elevated unlocked position, as shown in Figs. 3 and 4. In closing the door the operating spiral spring $t'''$, surrounding the connecting piston-rod $T'''$, will be compressed, as shown in Fig. 4, and in the last portion of the closing movement of the door the hook-catch $u'$ will be disengaged from the angle-arm $e$. This action will release both the toggle-lever and the operating-spring $t'''$, the action of which will operate to depress the toggle-lever to its horizontal locking position, (shown in Fig. 1,) which movement of the lever will shoot the bolts to their locking position and hold them securely, as therein shown.

The toggle-lever, by means of its roller-connection with the piston-rod, will cause the latter to descend with its downward movement. When the piston has reached its lowest point in the cylinder, the toggle-lever will be supported in its horizontal position on the piston-rod, as shown in Fig. 1, and securely hold the lock-bolts. The air contained within the cylinder escapes around the piston in the descent of the toggle-lever, thus serving to cushion the descent of said lever and prevent shock or jam in reaching its point of rest.

The inclined curved upper surface, $k''$, of the cam $k$, on which the toggle-lever is supported in its horizontal position, serves to carry the piston-rod to its inclined position, as shown in Fig. 2, when the traveling wheel $o^5$ has been carried by the action of the time-movements over the controlling-cam $P'$, as shown in Fig. 6, and permits the roller $d^4$ to pass over the upper inclined face, $k''$, of the cam $k$, and permits the toggle-lever to descend by the combined action of the operating-spring $t'''$ and the supplemental spring $v''$, to retract the locking bolts, as shown in Fig. 2, when the door will be unlocked and free to open.

I do not wish to confine myself to the particular system of lock-bolts herein shown and described, as they may be varied to adapt them to any particular case, and instead of the system shown any other known system or form of lock-bolts may be employed. In this instance I have employed two time-movements; but instead thereof a single movement or more than two movements may be employed. I have employed two operating-springs; but my improved apparatus is capable of use without the supplementary spring; but, if required, additional springs may be employed.

From the foregoing it will be seen that by means of the rotary dial, in its connection with the locking mechanism, the time-movements, and with the annular dial, the lock is capable of adjustments, before closing the door, to unlock at any predetermined time within twenty-four or forty-eight hours from the time of closing the door.

It will further be seen that the adjustment of the parts represented in the drawings requires the door in opening to swing through a semicircle to adjust the parts in their locking position, as shown in Fig. 5; but this swinging movement of the door may be limited to any point within the second quadrant of the circle, or even to points within the later portions of the first quadrant by means of the adjustable screw-nut $t^5$ on the connecting piston-rod $T'''$, or by the employment of a shorter connecting piston-rod.

It will still further be seen that the construction and arrangement of the parts of my improved locking mechanism are such that the door may be opened to any point less than the point at which the mechanism is adjusted in its locking position, and then closed without locking and free to be opened.

I claim as my invention—

1. The combination, with the lock-bolt mechanism, of a toggle-lever the arms of which have an endwise sliding movement, one of the arms of the lever being connected to the bolt-work, and means for preventing endwise movement of said lever-arms after adjustment to locking position, substantially as described.

2. The combination, with the lock-bolt mechanism, of a toggle-lever whose arms are capable of an endwise sliding movement relative to each other and a detent to lock said arms against said sliding movement, substantially as described.

3. The combination, with the lock-bolt mechanism, of a toggle-lever whose arms have a slotted connection to permit an endwise sliding movement of the arms, a detent to lock said arms against the sliding movement, and a stop arranged adjacent to said detent, substantially as described.

4. The combination, with the mechanism for operating the lock-bolts, an air-cylinder fitted with a valve, a piston fitted to the cylinder a piston-rod, and a pivoted guide supporting said piston-rod and allowing the free end of the rod a swinging movement, of a rotary cam and a traveling wheel connected with the piston-rod and engaging said cam, substantially as described.

5. In a time-lock, the combination, with the piston-rod and the pivoted guide therefor and a controlling-cam connected with the time-movements, of a spring-actuated lever having a pivotal connection with the guide of the piston-rod and a traveling wheel having a journaled support on the spring-actuated lever to engage the spiral trackway of the controlling-cam, substantially as described.

6. In a time-lock, the combination, with the time mechanism and the mechanism for moving the bolts, of a spirally-grooved cam connecting the time mechanism with said mechanism for moving the bolts, substantially as described.

7. In a time-lock, the combination, with the time mechanism and with the mechanism for moving the bolts, of a spirally-grooved cam connecting the time mechanism with the said mechanism for moving the bolts and an adjustable cap for said cam, substantially as described.

8. The combination, with the controlling-cam and with time-movements, of intermediate gear-wheels to connect the time-movements with the controlling-cam, said intermediate gear-wheels provided with clutching mechanism to produce an independent connection of the time-movements with the controlling-cam, substantially as described.

9. In a time-lock, the combination, with the fixed annular dial and the controlling-cam having a shaft, of the rotary dial mounted on the shaft of the controlling-cam and adapted to rotate concentrically with said annular dial, substantially as described.

10. In a time-lock, the combination, with the toggle-levers connected with the bolts, of a piston-rod, a traveling wheel arranged on the toggle-lever for the purpose described, and a cam on said piston-rod for causing the traveling wheel to engage the controlling-cam, substantially as described.

11. In a time-lock, the combination, with the controlling-cam and its adjustable cap, of a thumb-cap connected to said adjustable cap, substantially as described.

12. The combination, with the toggle-levers for operating the bolts, of a piston-rod and a cam arranged thereon to engage the toggle-lever, said cam being formed with an upper portion, $l$, and a lower portion, $k$, to form the working-faces $k'$, $k''$, and $l'$, substantially as described.

13. The combination, with the toggle-levers for operating the bolts, of an air-cylinder, said toggle-lever having a piston-rod connection with the piston of the cylinder to cushion the descent of the lever, substantially as described.

14. The combination, with the mechanism for operating the bolts, of guideways on the door, a cross-head supported on the guideways, and a lever having a pivotal connection with the door-jamb and with the cross-head to cause the latter to traverse the ways in the opening and closing movements of the door, substantially as described.

15. The combination, with the mechanism for operating the bolts, of the lever having a pivotal connection with the door-jamb and with the cross-head, and a roller having a pivotal support in the lever, substantially as described.

16. The combination, with the cross-head and with the toggle-lever, of a connecting piston-rod having a flexible connection with the cross-head, and guide having a pivotal connection with the toggle-lever, substantially as described.

17. The combination, with the toggle-lever for operating the bolts and with the cross-head, of the connecting piston-rod $T'''$, guides for said rod, a spring surrounding the rod, and a screw-nut to limit the movement of the rod in the guide, said screw-nut made adjustable on the rod, substantially as described.

18. The combination, with the guideways and with the toggle-lever, of a detent pivotally connected with the guideway and adapted to engage the toggle-lever, substantially as described.

19. The combination, with the guideways and the detent pivotally connected thereto and adapted to engage the toggle-lever, of a cylinder placed on the detent and a tubular tappet on the detent, said tappet made adjustable in its connection with the cylinder, substantially as described.

20. The combination, with the guideways secured upon the door and with the toggle-lever, of a detent to engage the toggle-lever, a cylinder placed on the detent, a spring arranged within the cylinder, and a tappet to disengage said detent automatically, substantially as described.

21. The combination, with the door-support and the door hinged thereto, of lock mechanism and mechanism controlled by the opening movement of the door to adjust the lock mechanism to locking position, substantially as described.

22. The combination, with the door-support and the door hinged thereto, of locking mechanism and mechanism controlled by the opening and closing movements of the door to respectively adjust the lock mechanism to locking position and to automatically operate the locking-bolts to lock the door, substantially as described.

CHARLES H. SHAFFER.

Witnesses:
M. B. ST. JOHN,
A. O. BEHEL.